United States Patent
Pudleiner et al.

(10) Patent No.: US 12,086,666 B2
(45) Date of Patent: Sep. 10, 2024

(54) LAYERED STRUCTURES WITH CUTTING LINES

(71) Applicants: Covestro Deutschland AG, Leverkusen (DE); Covestro Intellectual Property GmbH & Co. KG, Leverkusen (DE)

(72) Inventors: Heinz Pudleiner, Krefeld (DE); Georgios Tziovaras, Neuss (DE); Kira Planken, Goch (DE); Stefan Janke, Brüggen (DE); Christoph Koehler, Duisburg (DE); Roland Kuenzel, Leverkusen (DE); Daopeng Wang, Shanghai (CN); Meng Feng, Shanhgai (CN); Yizhe Zhao, Shanhgai (CN)

(73) Assignees: Covestro Deutschland AG, Leverkusen (DE); Covestro Intellectual Property GmbH & Co. KG, Leverkusen (DE)

( * ) Notice: Subject to any disclaimer, the term of this patent is extended or adjusted under 35 U.S.C. 154(b) by 47 days.

(21) Appl. No.: 17/781,487

(22) PCT Filed: Dec. 10, 2020

(86) PCT No.: PCT/EP2020/085398
§ 371 (c)(1),
(2) Date: Jun. 1, 2022

(87) PCT Pub. No.: WO2021/116239
PCT Pub. Date: Jun. 17, 2021

(65) Prior Publication Data
US 2023/0025063 A1    Jan. 26, 2023

(30) Foreign Application Priority Data

Dec. 13, 2019  (WO) ............... PCT/CN2019/125082
Jan. 21, 2020  (EP) .................................... 20152945

(51) Int. Cl.
*G06K 19/00*   (2006.01)
*G06K 19/02*   (2006.01)
*G06K 19/04*   (2006.01)
*G06K 19/077*  (2006.01)

(52) U.S. Cl.
CPC ......... *G06K 19/022* (2013.01); *G06K 19/041* (2013.01); *G06K 19/07722* (2013.01)

(58) Field of Classification Search
CPC ........... G06K 19/07739; G06K 19/077; G06K 19/07722; G06K 19/07743; G06K 19/06196; G06K 19/041; G06K 19/0719; G06K 19/0772; G06K 19/022; H01L 2224/48247; B32B 2307/732; B32B 2307/30
USPC ........................................ 235/488, 487, 492
See application file for complete search history.

(56) References Cited

U.S. PATENT DOCUMENTS

| | | |
|---|---|---|
| 3,644,574 A | 2/1972 | Winston et al. |
| 3,919,353 A | 11/1975 | Castelnuovo et al. |
| 4,097,446 A | 6/1978 | Abolins et al. |
| 4,806,593 A | 2/1989 | Kress et al. |
| 4,812,515 A | 3/1989 | Kress et al. |
| 4,859,740 A | 8/1989 | Damrath et al. |
| 4,861,831 A | 8/1989 | Damrath et al. |
| 6,320,751 B2 | 11/2001 | Takeda et al. |
| 7,183,636 B1 | 2/2007 | Boccia et al. |
| 7,686,228 B2 * | 3/2010 | Oddou ............. G06K 19/07745 235/487 |
| 2010/0006322 A1 * | 1/2010 | Cheng .................. G06K 19/077 174/250 |
| 2012/0193414 A1 * | 8/2012 | Thibaudeau ....... G06K 17/0003 235/441 |
| 2013/0175199 A1 * | 7/2013 | Fralicciardi .... G06K 19/07739 29/428 |
| 2016/0307090 A1 * | 10/2016 | Ho ........................ H04B 1/3816 |

FOREIGN PATENT DOCUMENTS

| | | |
|---|---|---|
| EP | 2884430 A1 | 6/2015 |
| JP | 6142734 B2 | 6/2017 |

OTHER PUBLICATIONS

Ullmanns, Enzyklopädie der Technischen Chemie [Ullmann's Encyclopedia of Industrial Chemistry], vol. 19 (1980), pp. 280 ff.
"Methoden der Organischen Chemie" [Methods of Organic Chemistry] (Houben-Weyl), vol. 14/1, Georg Thieme-Verlag, Stuttgart 1961, pp. 393-406.
W. Scholtan, H. Lange, Kolloid, Z. und Z. Polymere 250 (1972), 782 796.
International Search Report, PCT/EP2020/085398, date of mailing: May 3, 2021, Authorized officer: O. Ibarrola Torres.

* cited by examiner

Primary Examiner — Daniel St. Cyr
(74) Attorney, Agent, or Firm — John E. Mrozinski, Jr.

(57) ABSTRACT

The invention is related to a layered structure with at least one layer a. of a material with a VST≥85° C. comprising at least one cutting line b. reaching through the whole thickness of the layered structure surrounding at least one first portion which is extractable and reinsertable manually from the layered structure as well as a production process for such a layered structure.

9 Claims, No Drawings

LAYERED STRUCTURES WITH CUTTING LINES

CROSS REFERENCE TO RELATED APPLICATIONS

This application is a national stage application under 35 U.S.C. § 371 of PCT/EP2020/085398, filed Dec. 10, 2020, which claims benefit of European Application No. 20152945.0, filed Jan. 21, 2020, and PCT/CN2019/125082, filed Dec. 13, 2019, all of which are incorporated herein by reference in their entireties.

FIELD OF THE INVENTION

The invention is related to a layered structure with at least one layer a. of a material with a VST≥85° C. comprising at least one cutting line b. reaching through the whole thickness of the layered structure surrounding at least one first portion which is extractable and reinsertable manually from the layered structure.

BACKGROUND OF THE INVENTION

Especially, in the field of SIM cards there is a broad range of different sizes available which may be implemented in different electronic devices like mobile phones, laptops, notebooks, electronic tablets or the like. The conventional SIM cards for these devices are delivered as a perforated plastic card, mainly made from polyvinylchloride, where the different sizes, like 2 FF, 3 FF and 4 FF are connected by a nose-piece. When separating the differently sized SIM cards it often happens that the nose-pieces crack at a position which is not wanted. Furthermore, the force that has to be applied to separate the SIM card from the plastic card is so high that the SIM card may be destroyed or at least damaged. If the nose-piece has been broken at a wrong position the SIM card is not fit to fit into the SIM card slot of the electronic device anymore. Furthermore, an adapter is necessary if first the smallest SIM card has been extracted and afterwards a bigger one is needed for a different electronic device.

That is why there is a great need for SIM cards that are usable for several dimensions and adaptable to different devices after the first usage.

DETAILED DESCRIPTION OF THE INVENTION

An aim of the invention was to provide a layered structure, for example in form of a card, which allows the extraction and reinsertion of differently sized portions for several times. A further aim of the invention was to facilitate the extraction of the different portions without diminishing the holding force of the portion when reinserted into the layered structure. Furthermore, it was an aim to provide a process to provide a layered structure with the afore mentioned properties.

A first aspect of the invention is a layered structure with a length, a width and a height or thickness, for holding different sizes of portions, especially in form of cards, preferably SIM cards comprising:
   a. at least one layer a., preferably exactly one layer a. of a material with a Vicat softening temperature VST≥85° C., preferably a VST≥105° C., more preferably a VST≥125° C.; according to ISO 306 VST/B/50 (50 N; 50° C./h);
   b. at least one first cutting line b. reaching through the thickness of the layered structure surrounding at least one first portion, preferably having a size of a 2 FF sized SIM card;
   c. optionally at least one second cutting line c. surrounding a second portion which is positioned inside the first portion, preferably having a size of a 3 FF sized SIM card;
   d. optionally a third cutting line d. surrounding a third portion which is positioned inside the first and second portion, preferably having a size of a 4 FF sized SIM card;

wherein the first portion, optionally the optionally second portion and optionally the optionally third portion are extractable and reinsertable from the layered structure manually, preferably by applying a force in a range of from ≥0.5 N to ≤5 N, more preferably in a range of from ≥0.7 N to ≤3 N.

According to the invention extractable and reinsertable means that the force to be applied to extract and reinsert at least the first portion, preferably also the optional second portion and/or third portion, by a force of less than 7 N, preferably of less than 5 N, more preferably of less than 3 N.

Preferably, the layered structure consists of one layer a.

Preferably, at least the first portion and preferably also the second and third portion is held in the layered structure by a force of more than 0.5, more preferably of more than 1.2 N, most preferably of more than 1.5 N or in a range of 0.5 to 7 N, preferably in a range of 1 to 5 N, more preferably in a range of 1.5 to 3 N.

The cutting lines b., c. and d. form gaps between the first portion or second portion or third portion and the rest of the layered structure. The gaps are preferably in the same range along the whole cutting line a., b. or c.

Preferably, the layer a. comprises the polymeric material with a VST of ≥85° C.; preferably with a VST of ≥105° C., more preferably with a VST≥125° C., most preferably with a VST in a range of from ≥85° C. and ≤150° C. in an amount in a range of from 60 to 100 wt.-%, preferably in a range of from 70 to 95 wt.-%, more preferably in a range of from 75 to 90 wt.-%.

If the layered structure a. comprises more than the first cutting line b., preferably at least the second cutting line c. surrounding the second portion and optionally the third cutting line d. surrounding the third portion, the force for extracting and reinsertion of all portions, selected from the group consisting of the first portion, the second portion and the third portion are the same or vary by an amount of less than 100%, based on the lowest force for extracting and reinsertion of the three portions.

If the force for extracting and reinsertion the first portion is different from the force for extracting and reinsertion the second and/or the third portion, the force for extracting and reinsertion the first portion is higher than the force for extracting and reinsertion the second and the third portion.

As example, if the third portion is extractable by a force of 1.5 N, the second portion and/or the first portion are extractable by a force≤3 N. Alternatively, if the third portion is extractable by a force of 2.5 N, the second portion and/or the first portion are extractable by a force≤5 N.

Preferably, the force during extraction and reinsertion of the first portion is in a range of from ≥0.5 N to ≤5 N, more preferably in a range of from ≥0.7 N to ≤3 N, more preferably in a range of from ≥0.9 N to ≤2 N. Preferably, the force during extraction of the second portion is in a range of from ≥0.5 N to ≤5 N, more preferably in a range of from ≥0.6 N to ≤3 N, more preferably in a range of from ≥0.8 N to ≤2 N. Preferably, the force during extraction of the third portion is in a range of from ≥0.5 N to ≤4 N, more preferably in a range of from ≥0.6 N to ≤3 N, more preferably in a range of from ≥0.8 N to ≤2 N.

Preferably, the warpage of the layered structure including at least the first cutting line b., surrounding the at least one first portion is ≤1.0 mm. Preferably, the warpage of the layered structure including at least the first cutting line b. surrounding the at least one first portion and the second cutting line c. surrounding the second portion is ≤1.0 mm, more preferably ≤0.5 mm, more preferably ≤0.1 mm. The warpage is defined according to the invention by the differences of the height across the total length and width of the layered structure.

Preferably, the layered structure has a length in a range of 1 to 100 cm, more preferably in a range of 2 to 50 cm, most preferably in a range of 3 to 15 cm. Preferably, the width of the layered structure is in the range of from 0.5 to 50 cm, more preferably of from 0.8 to 30 cm, most preferably of from 1 to 20 cm. Preferably, the aspect ratio of the length to the height or thickness of the layered structure is in the range of from 1000:1 to 10:1, more preferably in a range of from 500:1 to 15:1, most preferably in a range of from 100:1 to 20:1. Preferably, the thickness of the layered structure is in a range of from 0.3 to 2 mm, more preferably in a range of from 0.5 to 1.5 mm, most preferably in a range of from 0.6 to 1 mm.

In a preferred embodiment of the layered structure the layered structure has a vertical deviation of the thickness of the layered structure in a range of from ≥0.005 to ≤0.09 mm, more preferably in a range of from ≥0.006 to ≤0.05 mm, most preferably in a range of from ≥0.007 to ≤0.03 mm over the whole area of the layered structure including the inserted at least one first portion, optionally the inserted at least one second portion and optionally the inserted at least one third portion. The deviation of the thickness is measured according to ISO7816-4:2013 standard in combination with ISO10373-3:2010 test method.

To support this low vertical deviation, it is preferred that the layered structure provides a symmetric setup. The symmetric structure is preferably selected from the group consisting of a single layer a., a multi-layer structure with an uneven number of layers, where the outer layers are identical, preferably a three-layer structure with identical outer layers. Preferably, the layered structure consists of a single layer a.

In a preferred embodiment of the layered structure the at least one first portion and the at least one second portion and optionally the at least one third portion is positioned in the at least one layer a. in a way to be extracted independently from each other, preferably in both directions relative to the plane of the layered structure. Independently, according to the invention means that it is possible to apply a force to one of the at least two or three portions, each surrounded by a separate cutting line in a way that only one of the portions can be separated from the rest of the layered structure without loosening the other portions. To achieve the extraction and reinsertion of the first portion it is preferred to apply a force in a range that is applicable by a human but not to low that the first portion falls out by itself.

In a preferred embodiment of the layered structure the layer a. comprises a polymeric material, hereinafter also called polymer A, selected from the group consisting of a polycarbonate, a co-polycarbonate, a blend of at least two polycarbonates, a blend of at least two co-poly carbonates, a blend of at least one polycarbonate and one co-polycarbonate or mixtures of at least two thereof. Preferred thermoplastic polymers are polycarbonates or copolycarbonates on the basis of diphenols, poly- or copolyacrylates and poly- or copolymethacrylates selected from the group consisting of polymethylmethacrylate (PMMA), thermoplastic polyurethanes, polyolefines, like types of polypropylene or polyolefine on the basis of cyclic olefines (e.g. TOPAS™), poly or co-polycondensates of an aromatic and/or a cycloalkyl dicarbonic acid and aliphatic, cycloaliphatic and/or araliphatic diols with 2 to 16 carbon atoms as by way of example and preferably poly or co-polycondensate(s) of a terephthalic acid, especially preferably poly or co-polyethylene terephthalate (PET or coPET), glycol modified PET (PETG), glycol modified poly or co-polycyclohexylene dimethylene terephthalate (PCTG) or poly or co-polybutylene terephthalate (PBT or coPBT), preferably poly- or co-polycondensates of naphthaline dicarboxylic acid, more preferably polyethylene glycol naphthalate (PEN), poly- or co-polycondensate of at least a cycloalkyldicarboxylic acid, like preferably polycyclohexane dimethanolcyclohexane dicarbonic acid (PCCD), polysulfone (PSU) and/or mixtures from at least two of the above compounds.

Preferably the layer a. comprises a blend of at least a polyester or a polycarbonate and a thermoplastic polyurethane.

In a preferred embodiment of the layered structure the layer a. comprises a blend of a polymer A comprising a polycarbonate or a co-polycarbonate and a graft polymer B. The graft polymers B comprise by way of example graft polymers with elastomeric properties. The polymers B with elastomeric properties are preferably obtainable from at least two of the following monomers: chloroprene, 1,3-butadiene, isoprene, styrene, acrylonitrile, ethylene, propylene, vinyl acetate, and (meth)acrylic esters having from 1 to 18 C atoms in the alcohol component; i.e. polymers as described by way of example in "Methoden der Organischen Chemie" [Methods of organic chemistry] (Houben-Weyl), vol. 14/1, Georg Thieme-Verlag, Stuttgart 1961, pp. 393 406, and in C. B. Bucknall, "Toughened Plastics", Appl. Science Publishers, London 1977.

Examples of particularly preferred polymers B are Acrylnitril-Butadien-Styrene (ABS) polymers (emulsion ABS, bulk ABS, and suspension ABS) as described by way of example in DE-OS (German Published Specification) 2 035 390 (=U.S. Pat. No. 3,644,574) or DE OS (German Published Specification) 2 248 242 (=GB patent 1 409 275), or in Ullmanns, Enzyklopddie der Technischen Chemie [Ullmann's encyclopedia of Industrial Chemistry], vol. 19 (1980), pp. 280 ff. The gel content of the graft base B.2 is at least 30% by weight, preferably at least 40% by weight (measured in toluene).

The graft (co)polymers B are produced via free-radical polymerization, e.g. via emulsion polymerization, suspension polymerization, solution polymerization, or bulk polymerization, preferably via emulsion polymerization or bulk polymerization.

Preferred polymers B have partial crosslinking and have gel contents of more than 20% by weight (measured in toluene), preferably more than 40% by weight, in particular more than 60% by weight. Gel content is determined in a suitable solvent at 25° C. (M. Hoffmann, H. Kromer, R. Kuhn, Polymeranalytik I und II [Polymer analysis I and II], Georg Thieme-Verlag, Stuttgart 1977). Preferred graft polymers B comprise graft polymers of:

B.1) from 5 to 95 parts by weight, preferably from 30 to 80 parts by weight, of a mixture
B.1.1) from 50 to 95 parts by weight of styrene, α-methylstyrene, methyl-ring-substituted styrene, $C_1$-$C_8$-alkyl methacrylate, in particular methyl methacrylate, $C_1$-$C_8$-alkyl acrylate, in particular methyl acrylate, or a mixture of these compounds, and
B.1.2) from 5 to 50 parts by weight of acrylonitrile, methacrylonitrile, $C_1$-$C_8$-alkyl methacrylates, in particular methyl methacrylate, $C_1$-$C_8$-alkyl acrylate, in particular methyl acrylate, maleic anhydride, $C_1$-$C_4$-alkyl- or -phenyl-N-substituted maleimides, or a mixture of said compounds,
B.2) from 5 to 95 parts by weight, preferably from 20 to 70 parts by weight, of a rubber-containing graft base.

It is preferable that the glass transition temperature of the graft base is below −10° C.

Unless otherwise stated in the present invention, glass transition temperatures are determined by means of dynamic differential scanning calorimetry (DSC) in accordance with the standard DIN EN 61006 at a heating rate of 10 K/min, where the Tg is defined as mid-point temperature (tangent method) and nitrogen is used as inert gas.

Particular preference is given to a graft base based on a polybutadiene rubber.

Preferred graft polymers B are by way of example styrene- and/or acrylonitrile-, and/or alkyl-(meth)acrylate-grafted polybutadienes, butadiene/styrene copolymers, and acrylate rubbers; i.e. copolymers of the type described in DE-OS (German Published Specification) 1 694 173 (=U.S. Pat. No. 3,564,077) alkyl-acrylate- or alkyl-methacrylate-, vinyl-acetate-, acrylonitrile-, styrene-, and/or alkylstyrene-grafted polybutadienes, butadiene/styrene copolymers, or butadiene/acrylonitrile copolymers, polyisobutenes, or polyisoprenes as described by way of example in DE-OS (German Published Specification) 2 348 377 (=U.S. Pat. No. 3,919,353).

Particularly preferred graft polymers B are graft polymers obtainable via graft reaction of
I. from 10 to 70% by weight, preferably from 15 to 50% by weight, in particular from 20 to 40% by weight, based on graft product, of at least one (meth)acrylate, or from 10 to 70% by weight, preferably from 15 to 50% by weight, in particular from 20 to 40% by weight, of a mixture of from 10 to 50% by weight, preferably from 20 to 35% by weight, based on mixture, of acrylonitrile or (meth)acrylate and from 50 to 90%, preferably from 65 to 80% by weight, based on mixture, of styrene, onto
II. from 30 to 90% by weight, preferably from 40 to 85% by weight, in particular from 50 to 80% by weight, based on graft product, of a butadiene polymer with at least 50% by weight, based on II, of butadiene moieties, as graft base.

The gel content of this graft base II is preferably at least 70% by weight (measured in toluene), the degree of grafting G preferably being from 0.15 to 0.55, and the median particle diameter $d_{50}$ of the graft polymer B preferably being from 0.05 to 2 μm, preferably from 0.1 to 0.6 μm.

(Meth)acrylates I are esters of acrylic acid or methacrylic acid and of monohydric alcohols having from 1 to 18 C atoms. Particular preference is given to methyl methacrylate, ethyl methacrylate, and propyl methacrylate.

The graft base II can comprise, alongside butadiene moieties, up to 50% by weight, based on II, of moieties of other ethylenically unsaturated monomers, such as styrene, acrylonitrile, esters of acrylic or methacrylic acid having from 1 to 4 C atoms in the alcohol component (for example methyl acrylate, ethyl acrylate, methyl methacrylate, ethyl methacrylate), vinyl esters, and/or vinyl ethers. The preferred graft base II is composed of pure polybutadiene.

As is known, the graft monomers are not necessarily grafted entirely onto the graft base during the graft reaction, and therefore the expression graft polymers B in the invention includes those products that are obtained via polymerization of the graft monomers in the presence of the graft base.

The degree of grafting G denotes the ratio by weight of grafted graft monomers to the graft base, and is dimensionless.

The median particle size $d_{50}$ is the diameter above and below which respectively 50% by weight of the particles lie. It can be determined by means of ultracentrifuge measurements (W. Scholtan, H. Lange, Kolloid, Z. und Z. Polymere 250 (1972), 782-796).

Other preferred graft polymers B are by way of example also graft polymers of
(a) from 20 to 90% by weight, based on B, of acrylate rubber as graft base and
(b) from 10 to 80% by weight, based on B, of at least one polymerizable, ethylenically unsaturated monomer where the glass transition temperature of this/these in the absence of a) resultant homo- or copolymers would be above 25° C., as graft monomers.

The glass transition temperature of the graft base made of acrylate rubber is preferably below −20° C., with preference below −30° C.

The acrylate rubbers (a) of the polymers B are preferably polymers of alkyl acrylates, optionally with up to 40% by weight, based on (a), of other polymerizable ethylenically unsaturated monomers. Among the preferred polymerizable acrylates are $C_1$-$C_8$-alkyl esters, for example methyl, ethyl-, n-butyl, n-octyl, and 2-ethylhexyl esters, and also mixtures of said monomers.

Monomers having more than one polymerizable double bond can be copolymerized for crosslinking purposes. Preferred examples of crosslinking monomers are esters of unsaturated monocarboxylic acids having from 3 to 8 C atoms and of unsaturated monohydric alcohols having from 3 to 12 C atoms, or of saturated polyols having from 2 to 4 OH groups and from 2 to 20 C atoms, e.g. ethylene glycol dimethacrylate, allyl methacrylate; polyunsaturated heterocyclic compounds, e.g. trivinyl and triallyl cyanurate; polyfunctional vinyl compounds, such as di- and trivinyl-benzenes; and also triallyl phosphate and diallyl phthalate.

Preferred crosslinking monomers are allyl methacrylate, ethylene glycol dimethacrylate, diallyl phthalate, and heterocyclic compounds which have at least 3 ethylenically unsaturated groups.

Particularly preferred crosslinking monomers are the cyclic monomers triallyl cyanurate, triallyl isocyanurate, trivinyl cyanurate, triacryloylhexahydro-s-triazine, triallyl-benzenes.

The amount of the crosslinking monomers is preferably from 0.02 to 5, preferably from 0.05 to 2% by weight, based on graft base (a).

In the case of cyclic crosslinking monomers having at least 3 ethylenically unsaturated groups it is advantageous to restrict the amount to less than 1% by weight of the graft base (a).

Preferred "other" polymerizable, ethylenically unsaturated monomers which can optionally serve, alongside the acrylates, for the production of the graft base (a) are by way of example acrylonitrile, styrene, α-methylstyrene, acrylamides, vinyl $C_1$-$C_6$-alkyl ethers, methyl methacrylate, butadiene.

Preferred acrylate rubbers as graft base (a) are emulsion polymers which have at least 60% by weight gel content.

Other suitable graft bases are silicone rubbers with graft-active sites and with at least 40% gel content (measured in dimethylformamide), as described in the laid-open specifications DE 37 04 657, DE 37 04 655, DE 36 31 540, and DE 36 31 539, and also silicone-acrylate composite rubbers.

In a preferred embodiment of the process the blend a. comprises the graft polymer in an amount in a range of from 0.1 to 20 wt.-%, more preferably in a range of from 0.2 to 15 wt.-%, even more preferably in a range of from 0.3 to 10 wt.-%, most preferably in a range of from 0.5 to 8 wt.-%, based on the total weight of the blend.

In a preferred embodiment the layered structure, the at least one layer a. or the whole layered structure has at least one, preferably at least two, more preferably all of the following properties:
  i. a thickness in a range of from 0.66 to 0.84 mm, preferably in a range of from 0.72 to 0.77 mm; or preferably in a range of from 0.66 to 0.72 mm, or preferably in a range of from 0.77 to 0.83 mm, measured according to ISO 4593 via micrometer or other calibrated meters;
  ii. a warpage over the whole area of the layered structure including the inserted at least one first portion, optionally the inserted at least one second portion and optionally the inserted at least one third portion of ≤1.0 mm, preferably of ≤0.9 mm, more preferably of ≤0.8 mm, measured by a profile projector or other calibrated meters.
  iii. a surface roughness of R3z≤11 μm, or preferably of R3z≤10 μm, measured according to ISO 4288:1996 by known roughness testers;
  iv. burr of the edges of ≤0.08 mm, preferably of ≤0.06 mm, measured according to ISO/IEC 7810:2003
  v. gaps between the first portion and the rest of the layered structure in a range of from ≥0.01 to ≤0.5 mm, more preferably in a range of from ≥0.02 to ≤0.4 mm, most preferably in a range of from ≥0.05 to ≤0.3 mm. The gaps between the second portion and the rest of the layered structure or between the third portion and the rest of the layered structure are preferably in a range of from ≥0.01 to ≤0.5 mm, more preferably in a range of from ≥0.02 to ≤0.4 mm, most preferably in a range of from ≥0.05 to ≤0.3 mm;
  vi. a low-temperature resistance of ≤−40° C., preferably of ≤−50° C., measured according to ISO 179.

Preferably, layer a. and or the layered structure provide properties selected from the group consisting of i. or ii. or iii. or iv. or v. or vi. or i. and ii. or i. and iii. or i. and iv. or i. and v. or i. and vi. or ii. and iii. or ii. and iv. or ii. and v. or ii. and vi. or iii. and iv. or iii. and v. or iii. and vi. or iv. and v. or iv. and vi. or v. and vi. or i. and ii. and iii. or i. and ii. and iv. or i. and ii. and v. or i. and ii. and vi. or i. and iii. and iv. or i. and iii. and v. or i. and iii. and vi. or i. and iv. and v. or i. and iv. and vi. or i. and v. and vi. or i. and ii. and iii. and iv. or i. and ii. and iii. and v. or i. and ii. and iii. and vi. or i. and ii. and iv. and v. or i. and ii. and iv. and vi. or i. and ii. and v. and vi. or i. and iii. and iv. and v. or i. and iii. and iv. and vi. or i. and iii. and v. and vi. or i. and ii. and iii. and iv. and v. or i. and ii. and iii. and iv. and vi. or i. and ii. and iii. and v. and vi. or i. and ii. and iv. and v. and vi. or i. and iii. and iv. and v. and vi. or ii. and iii. and iv. and v. and vi. or i. and ii. and iii. and iv. and v. and vi.

By the tests according to ISO 179 it is possible to determine whether the layer appearance has any color difference compared to the original layered structure or whether any crack phenomenon occur when keeping the layered structure at low temperatures.

A further aspect of the invention refers to a process of producing a layered structure comprising at least one layer a. incorporating at least one first portion, including the steps:
  S1. providing a layer a. comprising a polymeric material with a VST of ≥85° C.; preferably a VST≥105° C., more preferably a VST≥125° C., most preferably a VST in a range of from ≥85° C. and ≤150° C.;
  S2. producing a first cutting line b. into the layer a. to separate a first portion from the rest of the materiel of layer a., preferably having a size of a 4 FF sized SIM card;
  S3. optionally producing a second cutting line c. into the layer a. to separate a second portion from the rest of the material of layer a., whereby the second portion is surrounded by the first cutting line b. and the second cutting line c., preferably having a size of a 3 FF sized SIM card;
  S4. optionally producing a third cutting line d. into the layer a. to separate a third portion from the rest of the material of layer a., whereby the third portion is surrounded by the first cutting line b., the second cutting line c. and the third cutting line d., preferably having a size of a 2 FF sized SIM card;
  wherein the at least first portion, optionally the second portion and optionally the third portion are extractable and reinsertable from the perforation manually, preferably by applying a force in a range of from ≥0.5 N to ≤5 N, more preferably in a range of from ≥0.7 N to ≤3 N.

Preferably, the force during extraction and reinsertion of the first portion is in a range of from ≥0.5 N to ≤5 N, more preferably in a range of from ≥0.7 N to ≤3 N, more preferably in a range of from ≥0.9 N to ≤2 N. Preferably, the force during extraction of the second portion is in a range of from ≥0.5 N to ≤5 N, more preferably in a range of from ≥0.6 N to ≤3 N, more preferably in a range of from ≥0.8 N to ≤2 N. Preferably, the force during extraction and reinsertion of the third portion is in a range of from ≥0.5 N to ≤4 N, more preferably in a range of from ≥0.6 N to ≤3 N, more preferably in a range of from ≥0.8 N to ≤2N.

The providing of the layer a. can be established in any manner the person skilled in the art would choose for providing such a layer a. to produce a layered structure. Preferably, the providing of layer a. in step S1. is selected from the group consisting of providing a layer a. in form of a roll, a sheet, a staple, a foil or a combination of at least two thereof. The layer a. may be transported on a conveyer belt or by rolling the foil from a roll to another roll (roll-to-roll production). Preferably, the providing of layer a. in step S1. is in a sheet format.

The producing of a first cutting line b. in step S2. into the layer a. to separate a first portion from the rest of the materiel of layer a., preferably having a size of a 4 FF sized SIM card is preferably established by a cutting knife. Preferably, the cutting knife already has the form of the cutting line b., thus only one cut is needed to form the cutting line b. in step S2. in a way that a first portion is separated from the rest of the layered structure which can be extracted from the layered structure manually. However, also other cutting knifes could be applied which are enabled to cut a cutting line b. into the layer a. Preferably, the material of the cutting knife is selected from the group consisting of stainless steel, tungsten, alloys of stainless steel and tungsten, ceramics or any combination of at least two thereof.

In step S3., optionally a second cutting line c. is produced into the layer a. to separate a second portion from the rest of the material of layer a., whereby the second portion is surrounded by the first cutting line b. and the second cutting line c., preferably having a size of a 3 FF sized SIM card. The procedure of producing the second cutting line c. into the layer a. is preferably established by a cutting knife. Preferably, the cutting knife already has the form of the cutting line b., thus only one cut is needed to form the cutting line b. in step S3. in a way that a first portion is separated from the rest of the layered structure which can be extracted from the layered structure manually. However, also other cutting knifes could be applied which are enabled to cut a cutting line b. into the layer a. Preferably, the material of the cutting knife is selected from the group consisting of stainless steel, tungsten, alloys of stainless steel and tungsten, ceramics or any combination of at least two thereof.

In step S4., optionally a second cutting line d. is produced into the layer a. to separate a third portion from the rest of the material of layer a., whereby the third portion is surrounded by the first cutting line b., the second cutting line c. and the third cutting line d., preferably having a size of a 2 FF sized SIM card. The procedure of producing the second cutting line c. into the layer a. is preferably established by a cutting knife. Preferably, the cutting knife already has the form of the cutting line b., thus only one cut is needed to form the cutting line b. in step S3. in a way that a first portion is separated from the rest of the layered structure which can be extracted from the layered structure manually. However, also other cutting knifes could be applied which are enabled to cut a cutting line b. into the layer a. Preferably, the material of the cutting knife is selected from the group consisting of stainless steel, tungsten, alloys of stainless steel and tungsten, ceramics or any combination of at least two thereof.

The applied pressure to the layered structure for cutting the cutting lines b., c. and d. are preferably in the range of from 10 kN to 30 kN, more preferably in the range of from 16 to 20 kN. The knifes preferably have a flat profile and sharp cutting edges. If top-bottom matching knives (tools) are utilized for the production of the cutting lines b, optionally c. and optionally d. the gap between the top and the bottom cutting knives (tools) is preferably in a range of from 0.005 to 0.2 mm, more preferably in a range of from 0.007 to 0.05 mm, most preferably in a range of from 0.01 to 0.02 mm.

Preferably, the cutting lines b., c. and d. do not cross each other.

Preferably, the warpage of the layered structure is ≤1.0 mm, more preferably ≤0.95 mm, even more preferably ≤0.9 mm.

Preferably, the layer a. comprises the polymeric material with a VST of ≥85° C.; preferably a VST≥105° C., more preferably a VST≥125° C., most preferably a VST in a range of from ≥85° C. and ≤150° C. in an amount in a range of from 60 to 100 wt.-%, preferably in a range of from 70 to 95 wt.-%, more preferably in a range of from 75 to 90 wt.-%.

In a preferred embodiment of the process the layer a. comprises a polymeric material, hereinafter referred to as polymer A, selected from the group consisting of a polycarbonate, a co-polycarbonate, a blend of at least two polycarbonates, a blend of at least two co-polycarbonates, a blend of at least one polycarbonate and one co-polycarbonate or mixtures of at least two thereof.

In a preferred embodiment of the process the layer a. comprises a blend of a polymer A comprising a polycarbonate or a co-polycarbonate and a graft polymer B. Polymer A is preferably the same as described for the layered structure according to the invention. For all properties concerning polymer A it is referred to the description of polymer A in connection with the layered structure which also apply for the polymer A of layer a. in the process. Graft polymer B is preferably the same as described for the layered structure according to the invention. For all properties concerning polymer B it is referred to the description of the graft polymer B in connection with the layered structure which also apply for the polymer B of layer a. in the process.

In a preferred embodiment of the process the blend comprises the graft polymer B in an amount in a range of from 0.1 to 20 wt.-%, more preferably in a range of from 0.2 to 15 wt.-%, even more preferably in a range of from 0.3 to 10 wt.-%, most preferably in a range of from 0.5 to 8 wt.-%, based on the total weight of the blend.

In a preferred embodiment of the process the layered structure has at least one, preferably at least two, more preferably at least three, most preferably all of the following features:
  i. a thickness in a range of from 0.66 to 0.84 mm, preferably in a range of from 0.72 to 0.77 mm; or preferably in a range of from 0.66 to 0.72 mm, or preferably in a range of from 0.77 to 0.83 mm, measured according to ISO 4593 via micrometer or other calibrated meters;
  ii. a warpage over the whole area of the layered structure including the inserted at least one first portion, optionally the inserted at least one second portion and optionally the inserted at least one third portion of ≤1.0 mm, preferably of ≤0.9 mm, more preferably of ≤0.8 mm measured by a profile projector or other calibrated meters;
  iii. a surface roughness of R3z≤11 μm, or preferably of R3z≤10 μm, measured according to ISO 4288:1996 by known roughness testers;
  iv. all the edge burrs≤0.08 mm measured according to ISO/IEC 7810:2003;
  v. gaps between the first portion and the rest of the layered structure in a range of from ≥0.01 to ≤0.5 mm, more preferably in a range of from ≥0.02 to ≤0.4 mm, most preferably in a range of from ≥0.05 to ≤0.3 mm. The gaps between the second portion and the rest of the layered structure or between the third portion and the rest of the layered structure are preferably in a range of from ≥0.01 to ≤0.5 mm, more preferably in a range of from ≥0.02 to ≤0.4 mm, most preferably in a range of from ≥0.05 to ≤0.3 mm;
  vi. a low-temperature resistance of ≤−40° C., measured according to ISO 179;
  vii. a tensile strength in the range of 60 to 80 MPa, according to ISO 527-1:1996
  viii. an elongation at break in the range of 120 to 150%, according to ISO 527-1:1996;

The further properties described in connection with the layered structure, especially in connection with layer a., layer b. and layer c. are also applicable for the process according to the invention.

Preferably, the layered structure consists of exactly one layer a. and no further layer.

In a preferred embodiment of the process according to the invention the layered structure has a vertical deviation of its thickness in a range of ≥0.01 to ≤0.5 mm, preferably in a range of ≥0.05 to 0.2 mm over the whole area of the layered structure including the inserted at least one first portion, or the inserted at least one second portion, or the inserted at least one third portion.

EXAMPLES

The examples which follow serve to further illustrate the invention.

Component A-1

Bisphenol-A-based linear polycarbonate prepared by the interfacial process and having a weight-average molecular weight Mw of 24 000 g/mol (determined by GPC in dichloromethane using a polycarbonate standard), called Makrolon® 2408 000000 by Covestro AG, Germany Component A-2

Bisphenol-A-based linear polycarbonate having a weight-average molecular weight Mw of 31 000 g/mol (determined by GPC in dichloromethane using a polycarbonate standard), called Makrolon® 3100 000000, by Covestro AG, Germany Component B-1

Acid-precipitated ABS graft polymer with core-shell structure, prepared by emulsion polymerization of 43% by weight, based on the ABS polymer, of a mixture of 28% by weight of acrylonitrile and 72% by weight of styrene in the presence of 57% by weight, based on the ABS polymer, of a particulate-crosslinked polybutadiene rubber (median particle diameter d50=0.35 µm), called Terluran® HI 10 by INEOS Styrolution Ludwigshafen GmbH.

Component B-2

Base-precipitated ABS graft polymer with core-shell structure, prepared by emulsion polymerization of 50% by weight, based on the ABS polymer, of a mixture of 23% by weight of acrylonitrile and 77% by weight of styrene in the presence of 50% by weight, based on the ABS polymer, of a particulate-crosslinked polybutadiene rubber (median particle diameter d50=0.25 µm), called Sinopec® 8341 by Sinopec Corp., China.

Component C

Copolymer of 77% by weight of styrene and 23% by weight of acrylonitrile with a weight-average molecular weight Mw of 130 000 g/mol (determined by GPC), prepared by the bulk method, called Lustran® SAN DN 50 by INEOS Styrolution Ludwigshafen GmbH.

Component E-2

Pentaerythritol tetrastearate as lubricant/mould release agent FACI L348 by Faci Asia Pacific PTE Ltd.

Component F

Phosphite stabilizer, Irganox® B900 (mixture of 80% Irgafos® 168 and 20% Irganox® 1076; BASF AG; Ludwigshafen Germany;

Irgafos® 168 (tris(2,4-di-tert-butylphenyl) phosphite) BASF AG; Ludwigshafen Germany;

Irganox® 1076 (2,6-di-tert-butyl-4-(octadecanoxycarbonylethyl)phenol) BASF AG; Ludwigshafen Germany, Trilon® BS by BASF AG; Ludwigshafen Germany.

Component G:

Colouring agent, e.g. Black Pearls 800 pigments, Cabot Corp.

Example 1

Compounding

| | Batch | | | PUD 8736-1-P |
|---|---|---|---|---|
| Synonym | | | | PUD 8736-1 |
| Colour | | | | |
| Lot | | | | 7GCT55 |
| Batch size [g] | | | | 180000 |
| Comments | | | | |
| Feedstock | Lot | Comments | Unit | % by wt. |
| Pellets | | | | |
| M.2408P 000000 | | Component A-1 | | 69.950300 |
| LN SAN DN 50 | | | | 2.988000 |
| TERLURAN HI 10 | | Component B-1 | | 18.665300 |
| SINOPEC ABS 8391 | | Component B-2 | | 3.944200 |
| Powder mixture (PK) | | | | |
| Novodur® Powder P60 of INEOS Styrolution Lud. GmbH | | ABS powder | | 2.988000 |
| FACI L348 (PETS) | | Component E-2 | | 0.737100 |
| TRILON BS | | Component F | | 0.029900 |
| STABILIZER 1076 | | Component F | | 0.199200 |
| STABILIZER B 900 | | Component F | | 0.099600 |
| BLACK PEARLS 800 | | Component G | | 0.398400 |
| Subtotal | | | | 4.452200 |
| Total | | | | 100.000000 |
| Production | | | | |
| Analysis | | | | |
| Compounding line 7 | | General | | |
| | | Extruder | | Laboratory extruder_line 7 (ZSK 32) |
| | | Sample amount for requester | kg | 100 |
| | | Compounding parameters | | |

Compounding (for Layered Structure According to the Invention)

In a twin-screw extruder (Werner and Pfleiderer ZSK-32 MC$^{18}$ of Coperion GmbH, Germany), the feedstocks listed above were compounded and pelletized at a speed of 250 rpm and a throughput of 50 kg/h at a machine temperature of 290° C. In different zones of the machine the following temperatures were measured:

| Process parameter | Temperature |
| --- | --- |
| Zone 1 | 30° C. |
| Zone 2 | 178° C. |
| Zone 3 | 220° C. |
| Zone 4 | 242° C. |
| Zone 5 | 238° C. |
| Zone 6 | 238° C. |
| Zone 7 | 252° C. |
| Zone 8 | 248° C. |
| Zone 9 | 254° C. |
| Zone 10 | 258° C. |
| Zone 11 | 264° C. |
| Zone 12 | 264° C. |
| Melting temperature | 290° C. |
| Speed | 250 min$^{-1}$ |
| Torque | 88% |
| Throughput | 50 kg/h |

Example 2 (Inventive)

Film Extrusion (According to the Invention): 690 μm

For extrusion of 690 μm-thick film with a width of 450 mm, the compound of Example 1 is used.

The system used, consisted of an extruder having a screw of a diameter (D) 75 mm and a length 33×D. The screw has a devolatilization zone;

a melt pump;

a crosshead;

a slot die of a width 450 mm;

a three-roll smoothing calendar with horizontal roller orientation, wherein the third roller can swivel by +/−450 relative to the horizontal;

a roll conveyor;

thickness measurement;

a device for double-sided application of protective film;

a take-off device;

a winding station.

From the die, the melt arrived at the smoothing calendar, the rollers which were at the temperatures specified in the following Table. The material was finally shaped and cooled on the smoothing calendar. Subsequently, the film was transported through a draw-off device, the protective film was applied to either side, and then the film was wound up.

| Process parameter | Target | Actual |
| --- | --- | --- |
| Zone 1 | 220° C. | 194° C. |
| Zone 2 | 220° C. | 219° C. |
| Zone 3 | 235° C. | 234° C. |
| Zone 4 | 220° C. | 198° C. |
| Zone 5 | 250° C. | 249° C. |
| Zone 6 | 265° C. | 265° C. |
| Zone 7 | 270° C. | 269° C. |
| Zone 8 | 270° C. | 269° C. |
| Zone 9 | 270° C. | 269° C. |
| Zone 10 | 270° C. | 269° C. |
| Zone 11 | 270° C. | 271° C. |
| Zone 12 | 270° C. | 270° C. |
| Melt conduit zone 13 | 270° C. | 270° C. |
| Zone 14 | 270° C. | 270° C. |
| Zone 15 | 270° C. | 270° C. |

| | | | |
| --- | --- | --- | --- |
| Line speed W2: | | 3.70 m/min | |
| Roll 1: | 0.96 m/min | 40° C. | 40° C. |
| Roll 2: | 3.65 m/min | 100° C. | 100° C. |
| Roll 3: | 1.00 m/min | 0° C. | 0° C. |
| Draw rate: | | 0.96 m/min | |

Example 3 (Inventive)

Film Extrusion (According to the Invention): 800 μm

For extrusion of 800 μm-thick film of a width of 450 mm, the compound of Example 1 was used.

The system used consisted of an extruder having a screw of diameter (D) 75 mm and length 33×D. The screw has a devolatilization zone;

a melt pump;

a crosshead;

a slot die of width 450 mm;

a three-roll smoothing calendar with horizontal roller orientation, wherein the third roller can swivel by +/−45° relative to the horizontal;

a roll conveyor;

thickness measurement;

a device for double-sided application of protective film;

a takeoff device;

winding station.

From the die, the melt arrives at the smoothing calendar, the rollers which were at the temperatures specified in the following Table. The material was finally shaped and cooled on the smoothing calendar. Subsequently, the film was transported through a draw-off device, the protective film was applied to either side, and then the film was wound up.

| Process parameter | Target | Actual |
| --- | --- | --- |
| Zone 1 | 220° C. | 189° C. |
| Zone 2 | 220° C. | 220° C. |
| Zone 3 | 235° C. | 235° C. |
| Zone 4 | 220° C. | 197° C. |
| Zone 5 | 250° C. | 249° C. |
| Zone 6 | 265° C. | 265° C. |
| Zone 7 | 270° C. | 271° C. |
| Zone 8 | 270° C. | 270° C. |
| Zone 9 | 270° C. | 268° C. |
| Zone 10 | 270° C. | 269° C. |
| Zone 11 | 270° C. | 273° C. |
| Zone 12 | 270° C. | 270° C. |
| Zone 13 | 270° C. | 270° C. |
| Zone 14 | 270° C. | 270° C. |
| Zone 15 | 270° C. | 270° C. |

| | | | |
| --- | --- | --- | --- |
| Line speed W2: | | 3.10 m/min | |
| Roll 1: | 0.96 m/min | 40° C. | 40° C. |
| Roll 2: | 3.10 m/min | 101° C. | 101° C. |
| Roll 3: | 1.00 m/min | 0° C. | 0° C. |
| Draw rate: | | 0.96 m/min | |

Example 4

Compound of Black Colored Makrolon® on 3100 Basis by Covestro AG, Germany (not According to the Invention)

Production of a black-coloured compound with conventional twin-screw compounding extruders (e.g. ZSK 32) at processing temperatures of 250 to 330° C. which are customary for polycarbonate.

A compound was produced with the following composition:

Component A-2: Makrolon® 3100 000000 polycarbonate by Covestro AG, Germany in a proportion of 98.87% by weight Vulcan XC 72 carbon black by Cabot GmbH, Germany in a proportion of 1.13% by weight

Example 5

Film Extrusion (not According to the Invention):
Extruded Film Based on Compound from Example 4 (by Covestro AG, Germany; 200 μm)

For extrusion of 200 μm-thick polycarbonate films of a width of 450 mm, the compound of Example 4 was used.

The system used consisted of
an extruder having a screw of diameter (D) 75 mm and length 33×D. The screw has a devolatilization zone;
a melt pump;
a crosshead;
a slot die of width 450 mm;
a three-roll smoothing calendar with horizontal roller orientation, wherein the third roller can swivel by +/−450 relative to the horizontal;
a roll conveyor;
thickness measurement;
a device for double-sided application of protective film;
a takeoff device;
winding station.

From the die, the melt arrived at the smoothing calendar, the rollers which were at the temperatures specified in the following Table. The material was finally shaped and cooled on the smoothing calendar. Subsequently, the film was transported through a draw-off device, the protective film was applied to either side, and then the film was wound up.

| Process parameter | Temperatures |
|---|---|
| Zone 1 | 220° C. |
| Zone 2 | 280° C. |
| Zone 3 | 2800° C. |
| Zone 4 | 280° C. |
| Zone 5 | 280° C. |
| Zone 6 | 280° C. |
| Zone 7 | 280° C. |
| Zone 8 | 280° C. |
| Zone 9 | 280° C. |
| Zone 10 | 280° C. |
| Zone 11 | 280° C. |
| Zone 12 | 280° C. |
| Zone 13 | 280° C. |
| Zone 14 | 280° C. |
| Zone 15 | 280° C. |
| Extruder speed | 60 min$^{-1}$ |
| Melt pump speed | 44 min$^{-1}$ |
| Temperature of roll 1 | 40° C. |
| Temperature of roll 2 | 100° C. |
| Temperature of roll 3 | 130° C. |
| Calendar speed | 13.8 m/min |
| Throughput | 57 kg/h |
| Film width/thickness | 385 mm/200 μm |

Example 6

Compound of Black Colored Fibre Reinforced Makrolon® on 3100 Basis by Covestro AG, Germany (not According to the Invention)

Production of the black-coloured, glass fibre-reinforced compound with conventional twin-screw compounding extruders (e.g. ZSK 32 as described above) at processing temperatures of 250 to 330° C. that are customary for polycarbonate.

A compound was produced with the following composition:

| | |
|---|---|
| Makrolon ® 3100 000000 polycarbonate by Covestro AG, Germany | 61.10% |
| GF MF 7980 BC 00 (by Lanxess Deutschland GmbH) | 30.00% |
| Makrolon ® 3108 550115 polycarbonate powder by Covestro AG, Germany | 8.87% |
| BLACK PEARLS 800 conductive carbon black by Cabot GmbH, Germany | 0.03% |

Example 7

Film Extrusion (not According to the Invention):
Extruded Film Based on Compound from Example 6, 420 μm:

For extrusion of 420 μm-thick polycarbonate films of width 450 mm, the compound from Example 6 was used.

The system used consisted of
an extruder having a screw of diameter (D) 75 mm and length 33×D. The screw has a devolatilization zone;
a melt pump;
a crosshead;
a slot die of width 450 mm;
a three-roll smoothing calendar with horizontal roller orientation, wherein the third roller can swivel by +/−45° relative to the horizontal;
a roll conveyor;
thickness measurement;
a device for double-sided application of protective film;
a takeoff device;
winding station.

From the die, the melt arrived at the smoothing calendar, the rollers which were at the temperature specified in the following Table. The material was finally shaped and cooled on the smoothing calendar. Subsequently, the film was transported through a draw-off device, the protective film was applied to either side, then the film was wound up.

| Process parameter | Temperatures |
|---|---|
| Zone 1 | 220° C. |
| Zone 2 | 280° C. |
| Zone 3 | 280° C. |
| Zone 4 | 280° C. |
| Zone 5 | 280° C. |
| Zone 6 | 280° C. |
| Zone 7 | 280° C. |

| Process parameter | Temperatures |
| --- | --- |
| Zone 8 | 280° C. |
| Zone 9 | 280° C. |
| Zone 10 | 280° C. |
| Zone 11 | 280° C. |
| Zone 12 | 280° C. |
| Zone 13 | 280° C. |
| Zone 14 | 280° C. |
| Zone 15 | 280° C. |
| Extruder speed | 50 min$^{-1}$ |
| Melt pump speed | 34 min$^{-1}$ |
| Temperature of roll 1 | 40° C. |
| Temperature of roll 2 | 100° C. |
| Temperature of roll 3 | 130° C. |
| Calendar speed | 6.8 m/min |
| Throughput | 57 kg/h |
| Film width/thickness | 385 mm/420 μm |

Example 8

Compounding of Lass Fibre Reinforced Makrolon® (not According to the Invention)

| | |
| --- | --- |
| Makrolon® .3100 000000 (component A-2) | 61.10% |
| GF MF 7980 BC 00 | 30.00% |
| Makrolon® 3108 Powder | 8.90% |

Example 9

Film Extrusion (not According to the Invention):
Extruded Film Based on Compound from Example 8, 690 μm:

For extrusion of 690 μm-thick polycarbonate films of width 450 mm, the compound from Example 8 was used.

The system used consisted of
an extruder having a screw of diameter (D) 75 mm and length 33×D. The screw has a devolatilization zone;
a melt pump;
a crosshead;
a slot die of width 450 mm;
a three-roll smoothing calendar with horizontal roller orientation, wherein the third roller can swivel by +/−450 relative to the horizontal;
a roll conveyor;
thickness measurement;
a device for double-sided application of protective film;
a takeoff device;
winding station.

From the die, the melt arrived at the smoothing calendar, the rollers which were at the temperature specified in the following Table. The material was finally shaped and cooled on the smoothing calendar. Subsequently, the film was transported through a draw-off device, the protective film was applied to either side, then the film was wound up.

| Process parameter | Temperatures |
| --- | --- |
| Zone 1 | 220° C. |
| Zone 2 | 290° C. |
| Zone 3 | 280° C. |
| Zone 4 | 290° C. |
| Zone 5 | 290° C. |
| Zone 6 | 290° C. |
| Zone 7 | 290° C. |

| Process parameter | Temperatures |
| --- | --- |
| Zone 8 | 290° C. |
| Zone 9 | 280° C. |
| Zone 10 | 295° C. |
| Zone 11 | 295° C. |
| Zone 12 | 285° C. |
| Zone 13 | 295° C. |
| Zone 14 | 295° C. |
| Zone 15 | 295° C. |
| Extruder speed | 50 min$^{-1}$ |
| Melt pump speed | 34 min$^{-1}$ |
| Temperature of roll 1 | 40° C. |
| Temperature of roll 2 | 100° C. |
| Temperature of roll 3 | 130° C. |
| Calendar speed | 3.7 m/min |
| Throughput | 57 kg/h |
| Film width/thickness | 385 mm/690 μm |

Example 10

Film Extrusion (not According to the Invention):
Extruded Film Based on Compound from Example 8, 800 μm:

For extrusion of 800 μm-thick polycarbonate films of a width 450 mm, the compound from Example 8 was used.

The system used consisted of
an extruder having a screw of diameter (D) 75 mm and length 33×D. The screw has a devolatilization zone;
a melt pump;
a crosshead;
a slot die of width 450 mm;
a three-roll smoothing calendar with horizontal roller orientation, wherein the third roller can swivel by +/−45° relative to the horizontal;
a roll conveyor;
thickness measurement;
a device for double-sided application of protective film;
a takeoff device;
winding station.

From the die, the melt arrived at the smoothing calendar, the rollers which were at the temperatures specified in following Table. The material was finally shaped and cooled on the smoothing calendar. Subsequently, the film was transported through a draw-off device, the protective film was applied to either side, and then the film was wound up.

| Process parameter | Temperatures |
| --- | --- |
| Zone 1 | 220° C. |
| Zone 2 | 290° C. |
| Zone 3 | 280° C. |
| Zone 4 | 290° C. |
| Zone 5 | 290° C. |
| Zone 6 | 290° C. |
| Zone 7 | 290° C. |
| Zone 8 | 290° C. |
| Zone 9 | 280° C. |
| Zone 10 | 295° C. |
| Zone 11 | 295° C. |
| Zone 12 | 285° C. |
| LAYERED STRUCTURES WITH C | |
| Zone 13 | 295° C. |
| Zone 14 | 295° C. |
| Zone 15 | 295° C. |
| Extruder speed | 50 min$^{-1}$ |
| Melt pump speed | 34 min$^{-1}$ |
| Temperature of roll 1 | 40° C. |

-continued

| Process parameter | Temperatures |
|---|---|
| Temperature of roll 2 | 100° C. |
| Temperature of roll 3 | 130° C. |
| Calendar speed | 3.1 m/min |
| Throughput | 57 kg/h |
| Film width/thickness | 385 mm/800 μm |

Example 11

Die-Cutting Tests and Fit Accuracy of the Die-Cut Parts

On a Continental AG (former VDO) die-cutting tool experiments were established to assess different properties of the cut materials:

For this purpose, the VDO die-cutting tool (hereinafter referred to as VDO-tool) was utilized in the hydraulic press. With the VDO-tool a disc with a diameter of 8.5 cm was die-cut with a force of 15 N. Into this disc several rectangular cuts were established by applying the same force as for the disc. The rectangular cut outs had the following dimensions:

5.18 mm*3.68 mm;
22.61 mm*5.24 mm;
19.44 mm*5.24 mm;
19.50 mm*5.14 mm.

Films Examined:
Film from Example 3 (800 μm; according to the invention)
Film from Example 5 (800 μm laminate composed of 4 films a 200 μm; not according to the invention)

Results

Film of Example 5 (200 μm Laminate Composed of 4 Films; not According to the Invention)

The radius of the die-cut edge is quite large at 194/161 μm.

The edge lengths of 30.44 mm on the outside to 30.59 mm the inside do not give an accurate fit. The dimensions were measured via a microscope with 20 fold amplification. The deviation of the inside and outside edge lengths result in a force that has to be applied to extract and reinsert the disc which is higher than 5 N.

With tan $\alpha$=161 μm/194 μm the angle can be calculated together with the length and depth of the afore mentioned dimensions to $\alpha$=39.7°.

The reinsertion does not work well and the force to be applied for the reinsertion may result in damaging the disc.

Film from Example 3 (800 μm; According to the Invention)

The radius of the die-cut edge is moderate at 189/126 μm, calculated by the cutting machine.

The edge lengths of 30.57 mm on the outside to 30.57 mm on the inside give an absolutely perfect fit. The dimension were measured via a microscope with 20 fold amplification. The deviation of the inside and outside edge lengths is zero which is the reason why the force that has to be applied to extract and reinsert the disc is less than 3 N.

With tan $\alpha$=126 μm/189 μm the angle can be calculated together with the length and depth of the afore mentioned dimensions to $\alpha$=33.7°.

The reinsertion works very well at least 5 times.

Only Inventive Example 3 meets the demands.

Example 12

Measurement of Separation Force:

Cards in a format of 5.4*8.5 cm were first die-cut from the films as described in Example 2, Example 3, Example 9 and Example 10, with a thickness of 750 μm. These were then die-cut with the VDO die-cutting tool in such a way that a longitudinal edge was present. The die-cut part was pulled apart by means of a spring balance (from Pesola, 10 or 3 N) in order to ascertain the force required. The two halves are placed together again and a second measurement was conducted.

| Example | Card 1 M 1 | Card 1 M 2 | Card 2 M 1 | Card 2 M 2 |
|---|---|---|---|---|
| Example 9 (PUD 8731-1) not according to the invention | >10 | 8 | 9 | 7.5 |
| Example 10 (PUD 8731-2) not according to the invention | >10 | 8.5 | >10 | 8 |
| Example 2 (PUD 8731-3) according to the invention | 0.9 | 1.1 | 1.3 | 1.2 |
| Example 3 (PUD 8731-4) according to the invention | 1.5 | 1.5 | 1.5 | 1.5 |

The examples in the table above show that only the die-cut parts according to the invention can be reinserted into the die-cut gap and pulled out again without expenditure of force of more than 1.5 N, whereas the cards of the non-inventive material need a force of more than 7.5 N to be extracted.

Additional Examples with Colored Layered Structures

Example 13

Compounding (for Layered Structures According to the Invention)

In the formulation of Example 1 Black Pearl 800 is reduced to 0.1% and additionally 0.3% Macrolex Red E2G were added.

On a twin screw extruder (ZSK-32) (Fa. Werner und Pfleiderer) the above listed raw materials were compounded and pelletized at 250 rpm and a throughput of 50 kg/h at a machine temperature of 290° C.

| Processing parameters | Temperature |
|---|---|
| Zone 1 | 30° C. |
| Zone 2 | 178° C. |
| Zone 3 | 220° C. |
| Zone 4 | 242° C. |
| Zone 5 | 238° C. |
| Zone 6 | 238° C. |
| Zone 7 | 252° C. |
| Zone 8 | 248° C. |
| Zone 9 | 254° C. |
| Zone 10 | 258° C. |
| Zone 11 | 264° C. |
| Zone 12 | 264° C. |
| Melt temperature | 290° C. |
| Rotation speed | 250 mm$^{-1}$ |
| Torque | 88% |
| Throughput | 50 kg/h |

Example 14 (According to the Invention)

Film Extrusion (According to the Invention): 690 m

For the extrusion of a 690 μm thick film with a width of 450 mm the compound of example 13 was used.

The extrusion line consisted of
an extruder with a screw with 75 mm diameter (D) and a length of 33×D. The screw has a vent zone;
a melt pump;
a crosshead die;
a flat die with 450 mm width;
a three roller calender stack with horizontal roller set-up, in which the third roller can be swing +/−450 vs the horizontal position;
a roller conveyor;
a gauge control
a device for applying masking films on both sides;
a winder.

From the die the melt was metered on the roller stack, which has the temperatures listed in the following table. On the roller stack the surface was embossed and the material is cooled. Afterwards the film was transported by the conveyor belt, masking film was applied on both sides, and the film was winded.

| Processing parameters | Soll | Ist |
|---|---|---|
| Zone 1 | 220° C. | 194° C. |
| Zone 2 | 220° C. | 219° C. |
| Zone 3 | 235° C. | 234° C. |
| Zone 4 | 220° C. | 198° C. |
| Zone 5 | 250° C. | 249° C. |
| Zone 6 | 265° C. | 265° C. |
| Zone 7 | 270° C. | 269° C. |
| Zone 8 | 270° C. | 269° C. |
| Zone 9 | 270° C. | 269° C. |
| Zone 10 | 270° C. | 269° C. |
| Zone 11 | 270° C. | 271° C. |
| Zone 12 | 270° C. | 270° C. |
| Zone 13 | 270° C. | 270° C. |
| Zone 14 | 270° C. | 270° C. |
| Zone 15 | 270° C. | 270° C. |
| Line speed. W2: | | 3.70 m/min |
| roller 1: 0.96 m/min | 40° C. | 40° C. |
| roller 2: 3.65 m/min | 100° C. | 100° C. |
| roller 3: 1.00 m/min | 0° C. | 0° C. |
| winding: | | 0.96 m/min |

Example 15 (According to the Invention)

Film Extrusion (According to the Invention): 800 μm

For the extrusion of a 800 μm thick film with a width of 450 mm the compound of example 13 was used.

The extrusion line consists of
an extruder with a screw with 75 mm diameter (D) and a length of 33×D. The screw has a vent zone;
a melt pump;
a crosshead die;
a flat die with 450 mm width;
a three roller calender stack with horizontal roller set-up, in which the third roller can be swing +/−45° vs the horizontal position;
a roller conveyor;
a gauge control
a device for applying masking films on both sides;
a winder;

From the die the melt was metered on the roller stack, which has the temperatures listed in the following table. On the roller stack the surface was embossed and the material was cooled. Afterwards the film was transported by the conveyor belt, masking film was applied on both sides, and the film was winded.

| Processing parameters | planned | Realized in Process |
|---|---|---|
| Zone 1 | 220° C. | 189° C. |
| Zone 2 | 220° C. | 220° C. |
| Zone 3 | 235° C. | 235° C. |
| Zone 4 | 220° C. | 197° C. |
| Zone 5 | 250° C. | 249° C. |
| Zone 6 | 265° C. | 265° C. |
| Zone 7 | 270° C. | 271° C. |
| Zone 8 | 270° C. | 270° C. |
| Zone 9 | 270° C. | 268° C. |
| Zone 10 | 270° C. | 269° C. |
| Zone 11 | 270° C. | 273° C. |
| Zone 12 | 270° C. | 270° C. |
| Zone 13 | 270° C. | 270° C. |
| Zone 14 | 270° C. | 270° C. |
| Zone 15 | 270° C. | 270° C. |
| Line speed. W2: | | 3.10 m/min |
| roller 1: 0.96 m/min | 40° C. | 40° C. |
| roller 2: 3.10 m/min | 101° C. | 101° C. |
| roller 3: 1.00 m/min | 0° C. | 0° C. |
| winding: | | 0.96 m/min |

Example 16

Laser Marking of Film from Example 14 (According to the Invention)

Laser marking trials were performed on the Foba D84S
Laser Medium: Nd:YAG
Wave length: 1064 nm
Power: 40 Watt
Amperage: 30 A
Puls frequency: 10 KHz.
Speed: 100 mm/sec.

During laser marking the information was laser engraved into the film. A gold colored information was received.

The invention claimed is:

1. A layered structure with a length, a width and a height also called thickness, for holding different sizes of portions in form of cards, comprising:
   a. at least one layer a. of a material with a Vicat softening temperature (VST)≥85° C.;
   b. at least one first cutting line b. reaching through the thickness of the layered structure surrounding at least one first portion, having a size of a 2 FF sized subscriber identified module (SIM) card;
   c. optionally at least one second cutting line c. surrounding a second portion which is positioned inside the first portion, having a size of a 3 FF sized subscriber identified module (SIM) card;
   d. optionally at least one third cutting line d. surrounding a third portion which is positioned inside the first and second portion, having a size of a 4 FF sized subscriber identified module (SIM) card;
   wherein the at least first portion, optionally the optionally at least one second portion and optionally the at least one third portion each are extractable and reinsertable from the layered structure manually, by applying a force in a range of from ≥0.5 N to ≤5 N,
   wherein the layer a. has a vertical deviation of the thickness of the layered structure in a range of ≥0.01 to ≤0.5 mm over the whole area of the layered structure including the inserted at least one first portion, optionally the inserted at least one second portion and optionally the inserted at least one third portion, wherein the layer a. comprises a polymeric material selected from the group consisting of a polycarbonate, a co-polycarbonate, a blend of at least two polycarbonates, a blend of at least two co-polycarbonates, a blend of at least one polycarbonate and one co-polycarbonate, and mixtures of at least two thereof, and wherein the layered structure is selected from the group consisting of a single layer a. and a multi-layer structure with an uneven number of layers.

2. The layered structure according to claim 1, wherein the at least one first portion and the at least one second portion and optionally the at least one third portion is positioned in the at least one layer a. in a way to be extracted independently from each other.

3. The layered structure according to claim 1, wherein the layer a. comprises a blend of a polymer A which comprises a polycarbonate or a co-polycarbonate and a graft polymer B.

4. The layered structure according to claim 3, wherein the blend comprises the graft polymer B in an amount in a range of from 0.1 to 20 wt.-%, based on the total weight of the blend.

5. The layered structure according to claim 1, wherein the at least one layer a. or the whole layered structure has at least one, of the following properties:
   i. a thickness in a range of from 0.66 to 0.84 mm;
   ii. a warpage of ≤1.0 mm;
   iii. a surface roughness of R3z≤11 µm;
   iv. all the edge burrs≤0.08 mm;
   v. a low-temperature resistance of ≤−40° C.;
   vi. a tensile strength in the range of 60 to 80 Mpa;
   vii. elongation at break in the range of 120 to 150%.

6. A process of producing a layered structure comprising at least one layer a. incorporating at least one first portion, the process including the steps of:
   S1. Providing a layer a. comprising a polymeric material with a Vicat softening temperature (VST) of ≥85° C.;
   S2. producing a first cutting line b. into the layer a. to separate a first portion from the rest of the materiel of layer a., having a size of a 4 FF sized subscriber identified module (SIM) card;
   S3. optionally producing a second cutting line c. into the layer a. to separate a second portion from the rest of the material of layer a., wherein the second portion is surrounded by the first cutting line b. and the second cutting line c., having a size of a 3 FF sized subscriber identified module (SIM) card;
   S4. optionally producing a third cutting line d. into the layer a. to separate a third portion from the rest of the material of layer a., wherein the third portion is surrounded by the first cutting line b., the second cutting line c. and the third cutting line d., having a size of a 2 FF sized subscriber identified module (SIM) card;

wherein the at least first portion, optionally the second portion and optionally the third portion are extractable and reinsertable from the perforation manually, by applying a force in a range of from ≥0.5 N to ≤5 N, wherein the layer a. has a vertical deviation of the thickness of the layered structure in a range of ≥0.01 to ≤0.5 mm over the whole area of the layered structure including the inserted at least one first portion, optionally the inserted at least one second portion and optionally the inserted at least one third portion, wherein the layer a. comprises a polymeric material selected from the group consisting of a polycarbonate, a co-polycarbonate, a blend of at least two polycarbonates, a blend of at least two co-polycarbonates, a blend of at least one polycarbonate and one co-polycarbonate, and mixtures of at least two thereof, and wherein the layered structure is selected from the group consisting of a single layer a. and a multi-layer structure with an uneven number of layers.

7. The process according to claim 6, wherein the layer a. comprises a blend of a polymer A, which comprises a polycarbonate or a co-polycarbonate and a graft polymer B.

8. The process according to claim 7, wherein the blend comprises the graft polymer in an amount in a range of from 0.1 to 20 wt.-%, based on the total weight of the blend.

9. The process according to claim 6, wherein the layered structure has at least one of the following features:
   i. a thickness in a range of from 0.66 to 0.84 mm;
   ii. a warpage of ≤1.0 mm;
   iii. a surface roughness of R3z≤11 µm;
   iv. all the edge burrs≤0.08 mm;
   v. a low-temperature resistance of ≤−40° C.;
   vi. a tensile strength in the range of 60 to 80 MPa;
   vii. elongation at break in the range of 120 to 150%.

* * * * *

UNITED STATES PATENT AND TRADEMARK OFFICE
CERTIFICATE OF CORRECTION

| | |
|---|---|
| PATENT NO. | : 12,086,666 B2 |
| APPLICATION NO. | : 17/781487 |
| DATED | : September 10, 2024 |
| INVENTOR(S) | : Heinz Pudleiner et al. |

It is certified that error appears in the above-identified patent and that said Letters Patent is hereby corrected as shown below:

In the Claims

Column 23, Line 41, Claim 6, replace the text "materiel" with "material".

Signed and Sealed this
Fifteenth Day of October, 2024

Katherine Kelly Vidal
*Director of the United States Patent and Trademark Office*